(12) United States Patent
Whelchel et al.

(10) Patent No.: US 12,421,578 B2
(45) Date of Patent: Sep. 23, 2025

(54) Al—Zn—Cu—Mg ALLOYS WITH HIGH STRENGTH AND METHOD OF FABRICATION

(71) Applicant: CONSTELLIUM ISSOIRE, Issoire (FR)

(72) Inventors: Ricky Whelchel, Athens, OH (US); Erembert Nizery, Grenoble (FR); Diana Koschel, Saint Jean de Moirans (FR); Jean-Christophe Ehrstrom, Grenoble (FR); Timothy Warner, Corenc (FR)

(73) Assignee: CONSTELLIUM ISSOIRE, Issoire (FR)

( * ) Notice: Subject to any disclaimer, the term of this patent is extended or adjusted under 35 U.S.C. 154(b) by 0 days.

(21) Appl. No.: 17/943,827

(22) Filed: Sep. 13, 2022

(65) Prior Publication Data
US 2023/0012938 A1 Jan. 19, 2023

Related U.S. Application Data

(62) Division of application No. 16/650,285, filed as application No. PCT/EP2018/075820 on Sep. 24, 2018, now abandoned.

(30) Foreign Application Priority Data

Sep. 26, 2017 (FR) ...................................... 1758914

(51) Int. Cl.
C22C 21/10 (2006.01)
B64C 3/18 (2006.01)
C22F 1/053 (2006.01)

(52) U.S. Cl.
CPC .............. *C22C 21/10* (2013.01); *B64C 3/185* (2013.01); *B64C 3/187* (2013.01); *C22F 1/053* (2013.01)

(58) Field of Classification Search
CPC ................................. C22C 21/10; C22F 1/053
See application file for complete search history.

(56) References Cited

U.S. PATENT DOCUMENTS 5,312,498 A 5/1994 Anderson
5,560,789 A 10/1996 Sainfort et al.
(Continued)

FOREIGN PATENT DOCUMENTS

AU 4751193 A 3/1994
CN 103233148 A 8/2013
(Continued)

OTHER PUBLICATIONS

Holroyd, N.J. Henry et al., "Stress Corrosion Crackin in Al—Zn—Mg—Cu Aluminum Alloys in Saline Environments", Metallurgical and Materials Transactions A, Mar. 2013, pp. 1230-1253, vol. 44A.
French Search Report of French Patent Application No. 1758914 dated May 4, 2018.
Scully, J.R. et al., "Hydrogen embrittlement of aluminum and aluminum-based alloys", in "Gaseous hydrogen embrittlement of materials in energy technologies", 2012, pp. 707-768, Woodhead Publishing.
(Continued)

Primary Examiner — Christina A Johnson
(74) Attorney, Agent, or Firm — McBee Moore & Vanik IP, LLC

(57) ABSTRACT

The invention relates to a rolled product made of aluminum alloy with a thickness of at least 50 mm comprising (in weight %): Zn 6.9-7.5; Mg 1.8-2.2; Cu 1.8-2.2, where the sum Cu+Mg is between 3.8 and 4.2; Zr 0.04-0.14; Mn 0-0.1; Ti 0-0.15; V 0-0.1; Fe ≤0.15; If ≤0.15; impurities ≤0.05 each and ≤0.15 total, balance aluminum. The invention also relates to the method of manufacturing such a product. The products according to the invention are particularly advantageous because they have a very favorable compromise between static mechanical strength, toughness and environmental-assisted cracking performance under conditions of high stress and humid environment.

12 Claims, 1 Drawing Sheet

(56) References Cited

U.S. PATENT DOCUMENTS

| | | | |
|---|---|---|---|
| 5,865,911 | A | 2/1999 | Miyasato et al. |
| 6,027,582 | A | 2/2000 | Shahani et al. |
| 6,972,110 | B2 | 12/2005 | Chakrabarti et al. |
| 8,277,580 | B2 | 10/2012 | Dangerfield et al. |
| 8,673,209 | B2 | 3/2014 | Bray et al. |
| 2002/0015658 | A1 | 2/2002 | Rioja et al. |
| 2005/0006010 | A1* | 1/2005 | Benedictus ............. C22F 1/053 148/552 |
| 2005/0150578 | A1* | 7/2005 | Bes ........................ C22C 21/10 148/439 |
| 2006/0191609 | A1 | 8/2006 | Dangerfield et al. |
| 2014/0224386 | A1 | 8/2014 | Benedictus et al. |

FOREIGN PATENT DOCUMENTS

| | | | |
|---|---|---|---|
| EP | 0030070 | A1 | 9/1980 |
| EP | 1544315 | A1 | 6/2005 |
| FR | 2853666 | A1 | 10/2004 |
| JP | 2011058047 | A * | 3/2011 |
| WO | 2004090183 | A1 | 10/2004 |
| WO | 2005/001149 | A2 | 1/2005 |
| WO | 2006086534 | A2 | 8/2006 |

OTHER PUBLICATIONS

International Search Report of International Patent Application No. PCT/EP2018/075820 dated Oct. 25, 2018.
Alloys, Wrought Aluminum, "International Alloy Designations and Chemical Composition Limits for Wrought Aluminum and Wrought Aluminum Alloys," (2015).
Aluminum Association. International Alloy Designations and Chemical Composition Limits for Wrought and Wrought Aluminum Alloys: "Teal Sheets", Aluminum Association, pp. 1-32, Jan. 2015.
Spiekermann, P. "Alloys—a special problem of patent law." Nonpublished English translation of document (1993): 1-20.
Aluminum Association, Inc. Rolling aluminum: from the mine through the mill. Aluminum Association, 1990.
Rometsch, et al. "Heat treatment of 7xxx series aluminium alloys—Some recent developments." Transactions of Nonferrous Metals Society of China 24, No. 7 (2014): 2003-2017.
Starke Jr, et al. "Application of modern aluminum alloys to aircraft." Progress in aerospace sciences 32, No. 2-3 (1996): 131-172.
ASM International. Handbook Committee. ASM Handbook: Fatigue and fracture. vol. 19. ASM International, 1990.

* cited by examiner

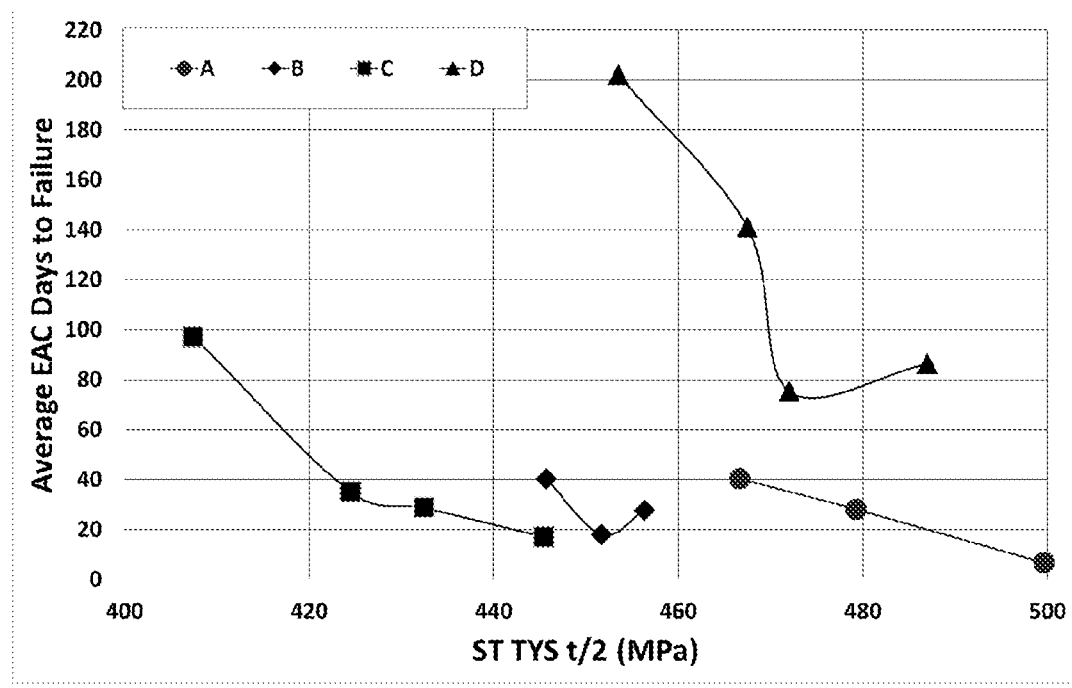

Al—Zn—Cu—Mg ALLOYS WITH HIGH STRENGTH AND METHOD OF FABRICATION

CROSS-REFERENCE TO RELATED APPLICATIONS

This application is a Divisional Application of U.S. patent application Ser. No. 16/650,285, filed 24 Mar. 2020, which is National Stage entry of International Application No. PCT/EP2018/075820, filed 24 Sep. 2018, which claims priority to French Patent Application No. 1758914, filed 26 Sep. 2017. Each of these applications is incorporated by reference in its entirety.

FIELD OF THE INVENTION

The present invention relates generally to aluminum base alloys and more particularly, Al—Zn—Cu—Mg aluminum base alloys, in particular for aerospace applications.

DESCRIPTION OF RELATED ART

Al—Zn—Cu—Mg aluminum base alloys have been used extensively in the aerospace industry for many years. With the evolution of airplane structures and efforts directed towards the goal of reducing both weight and cost, an optimum compromise between properties such as strength, toughness and corrosion resistance is continuously sought. Also, process improvements in casting, rolling and heat treatment can advantageously provide further control in the composition diagram of an alloy.

Thick rolled products made of Al—Zn—Cu—Mg aluminum base alloys are used in particular to produce integrally machined high strength structural parts for the aeronautic industry, for example wing elements such as wing ribs, spars, frames and the like, which are typically machined from thick wrought sections.

The performance values obtained for various properties such as static mechanical strength, fracture toughness, resistance to corrosion, quench sensitivity, fatigue resistance, and level of residual stress will determine the overall performance of the product, the ability for a structural designer to use it advantageously, as well as the ease it can be used in further processing steps such as, for example, machining.

Among the above listed properties some are often conflicting in nature and a compromise generally has to be found. Conflicting properties are, for example, static mechanical strength versus toughness and strength versus resistance to corrosion.

Among corrosion or environmentally assisted cracking (EAC) properties, a distinction can be made between EAC under conditions of high stress and humid environment and EAC under conditions of standard stress corrosion cracking (SCC) tests, such as ASTM G47, where specimens are tested using alternate immersion and drying cycles with NaCl solution (ASTM G44) and typically using lower stress. Standard SCC failure can occur by a mixture of both anodic dissolution due to local potential differences and hydrogen embrittlement, whereas for EAC under conditions of high stress and humid environment hydrogen embrittlement is the most likely failure mode, (see for example J. R. SCULLY, G. A. YOUNG JR, S. W. SMITH, "Hydrogen embrittlement of aluminum and aluminum based alloys", in "Gaseous hydrogen embrittlement of materials in energy technologies, Edited by R. P. Glangloff and B. P. Somerday, Woodhead Publishing 2012, pp707-768).

The development of a high strength 7XXX alloy that has low sensitivity to EAC under conditions of high stress and humid environment would be a significant improvement. In particular it is sought to obtain alloys with higher strength than known alloys such as AA7010 or AA7050 but exhibiting similar or higher resistance to EAC under conditions of high stress and humid environment.

Al—Zn—Mg—Cu alloys with high fracture toughness, high mechanical strength and high resistance to standard SCC are described in the prior art.

U.S. Pat. No. 5,312,498 discloses a method of producing an aluminum-based alloy product having improved exfoliation resistance and fracture toughness which comprises providing an aluminum-based alloy composition consisting essentially of about 5.5-10.0% by weight of zinc, about 1.75-2.6% by weight of magnesium, about 1.8-2.75% by weight of copper with the balance aluminum and other elements. The aluminum-based alloy is worked, heat treated, quenched and aged to produce a product having improved corrosion resistance and mechanical properties. The amounts of zinc, magnesium and copper are stoichiometrically balanced such that after precipitation is essentially complete as a result of the aging process, no excess elements are present. Exfoliation corrosion is specific to low thickness products and in particular sensitive for extruded products.

U.S. Pat. No. 5,560,789 describes AA 7000 series alloys having high mechanical strength and a process for obtaining them. The alloys contain, by weight, 7 to 13.5% Zn, 1 to 3.8% Mg, 0.6 to 2.7% Cu, 0 to 0.5% Mn, 0 to 0.4% Cr, 0 to 0.2% Zr, others up to 0.05% each and 0.15% total, and remainder Al, corrosion properties are however not mentioned.

U.S. Pat. No. 5,865,911 describes an aluminum alloy consisting essentially of (in weight %) about 5.9 to 6.7% zinc, 1.8 to 2.4% copper, 1.6 to 1.86% magnesium, 0.08 to 0.15% zirconium balance aluminum and incidental elements and impurities. The '911 patent particularly mentions the compromise between static mechanical strength and toughness.

U.S. Pat. No. 6,027,582 describes a rolled, forged or extruded Al—Zn—Mg—Cu aluminum base alloy products greater than 60 mm thick with a composition of (in weight %), Zn: 5.7-8.7, Mg: 1.7-2.5, Cu: 1.2-2.2, Fe: 0.07-0.14, Zr: 0.05-0.15 with Cu+Mg<4.1 and Mg>Cu. The '582 patent also describes improvements in quench sensitivity.

U.S. Pat. No. 6,972,110 teaches an alloy, which contains preferably (in weight %) Zn: 7-9.5, Mg: 1.3-1.68 and Cu 1.3-1.9 and encourages keeping Mg+Cu≤3.5. The '110 patent discloses using a three step aging treatment in order to improve resistance to stress corrosion cracking. A three step aging is long and difficult to master and it would be desirable to obtain high corrosion resistance without necessarily requiring such a thermal treatment.

PCT Patent application No WO2004090183 discloses an alloy comprising essentially (in weight percent): Zn: 6.0-9.5, Cu: 1.3-2.4, Mg: 1.5-2.6, Mn and Zr<0.25 but preferably in a range between 0.05 and 0.15 for higher Zn contents, other elements each less than 0.05 and less than 0.25 in total, balance aluminium, wherein (in weight percent): 0.1[Cu]+ 1.3<[Mg]<0.2[Cu]+2.15, preferably 0.2[Cu]+1.3<[Mg]<0.1 [Cu]+2.15. This patent application is directed to plates for upper wing skin with a thickness from 15 to 45 mm.

PCT patent application No. WO2005001149 relates to a extruded, laminated or forged aluminium alloy product, comprising (in weight %): Zn 6.7 7.5%, Cu 2.0 2.8%, Mg 1.6 2.2 one or several elements selected from the group Zr 0.08 0.20%, Cr 0.05 0.25%, Sc 0.01 0.50%, Hf 0.05 0.20%, V 0.02 0.20%, Fe+Si<0.20%, other elements =0.05% each and =0.15% in total, the residue being aluminium.

US Patent application No 2005/006010 a method for producing a high strength Al—Zn—Cu—Mg alloy with an improved fatigue crack growth resistance and a high damage tolerance, comprising the steps of casting an ingot with the following composition (in weight percent) Zn 5.5-9.5, Cu 1.5-3.5, Mg 1.5-3.5, Mn<0.25, Zr<0.25, Cr<0.10, Fe<0.25, Si<0.25, Ti<0.10, Hf and/or V<0.25, other elements each less than 0.05 and less than 0.15 in total, balance aluminum, homogenizing and/or pre-heating the ingot after casting, hot working the ingot and optionally cold working into a worked product of more than 50 mm thickness, solution heat treating, quenching the heat treated product, and artificially ageing the worked and heat-treated product, wherein the ageing step comprises a first heat treatment at a temperature in a range of 105° C. to 135° C. for more than 2 hours and less than 8 hours and a second heat treatment at a higher temperature than 135° C. but below 170° C. for more than 5 hours and less than 15 hours. Again, such three step aging is long and difficult to master.

EP Patent 1 544 315 discloses a product, especially rolled, extruded or forged, made of an AlZnCuMg alloy with constituents having the following percentage weights: Zn 6.7-7.3; Cu 1.9-2.5; Mg 1.0-2.0; Zr 0.07-0.13; Fe less than 0.15; Si less than 0.15; other elements not more than 0.05 to at most 0.15 percent in total; and aluminum the remainder. The product is preferably treated by solution heat treatment, quenching, cold working and artificial aging.

U.S. Pat. No. 8,277,580 teaches a rolled or forged Al—Zn—Cu—Mg aluminum-based alloy wrought product having a thickness from 2 to 10 inches. The product has been treated by solution heat-treatment, quenching and aging, and the product comprises (in weight-%): Zn 6.2-7.2, Mg 1.5-2.4, Cu 1.7-2.1. Fe 0-0.13, Si 0-0.10, Ti 0-0.06, Zr 0.06-0.13, Cr 0-0.04, Mn 0-0.04, impurities and other incidental elements ⇐0.05 each.

U.S. Pat. No. 8,673,209 discloses aluminum alloy products about 4 inches thick or less that possesses the ability to achieve, when solution heat treated, quenched, and artificially aged, and in parts made from the products, an improved combination of strength, fracture toughness and corrosion resistance, the alloy consisting essentially of: about 6.8 to about 8.5 wt. % Zn, about 1.5 to about 2.00 wt. % Mg, about 1.75 to about 2.3 wt. % Cu; about 0.05 to about 0.3 wt. % Zr, less than about 0.1 wt. % Mn, less than about 0.05 wt. % Cr, the balance Al, incidental elements and impurities and a method for making same.

The effect of 7XXX alloy composition on SCC resistance has been recently reviewed (N. J. Henry Holroyd and G. M. Scamans, "Stress Corrosion Cracking in Al—Zn—Mg—Cu Aluminum Alloys in Saline Environments," *Metall. Mater. Trans. A*, vol. 44, pp. 1230-1253, 2013.). It was concluded that SCC growth rates at room temperature for peak and over-aged tempers in saline environments are minimized for Al—Zn—Mg—Cu alloys containing less than 8 wt. % Zn when Zn/Mg ratios are ranging from 2 to 3, excess magnesium compared to stoichiometric levels are less than 1 wt. % and copper content is either less than 0.2 wt. % or ranging from 1.3 to 2 wt. %.

None of the documents, which describe high strength 7xxx alloy products, describe alloy products with low sensitivity to EAC under conditions of high stress and humid environment and having simultaneously high strength and high toughness properties.

SUMMARY OF THE INVENTION

An object of the invention was to provide an Al—Zn—Cu—Mg alloy having a specific composition range that enables, for rolled products, an improved compromise among mechanical strength for an appropriate level of fracture toughness and resistance to EAC under conditions of high stress and humid environment.

Another object of the invention was the provision of a manufacturing process of rolled aluminum products which enables an improved compromise among mechanical strength for an appropriate level of fracture toughness and resistance to EAC under conditions of high stress and humid environment.

To achieve these and other objects, the present invention is directed to a rolled aluminum-based alloy product having a thickness of at least 50 mm comprising, or advantageously consisting essentially of (in weight %):

Zn 6.9-7.5

Mg 1.8-2.2

Cu 1.8-2.2, wherein the sum Cu+Mg is between 3.8 and 4.2

Zr 0.04-0.14

Mn 0-0.1

Ti 0-0.15

V 0-0.1

Fe ≤0.15

Si ≤0.15 impurities ≤0.05 each and ≤0.15 wt. % total, balance aluminum.

The present invention is also directed to a process for the manufacture of a rolled aluminum-based alloy product comprising the steps of:

a) casting an ingot comprising, or advantageously consisting essentially of (in weight-%)

Zn 6.9-7.5

Mg 1.8-2.2

Cu 1.8-2.2, wherein the sum Cu+Mg is between 3.8 and 4.2

Zr 0.04-0.14

Mn 0-0.1

Ti 0-0.15

V 0-0 0.1

Fe ≤0.15

Si ≤0.15 impurities ≤0.05 each and ≤0.15 wt. % total, balance aluminum.

b) homogenizing the ingot c) hot rolling said homogenized ingot to rolled product with a final thickness of at least 50 mm;

d) solution heat treating and quenching the product;

e) stretching the product;

f) artificial aging with the equivalent aging time t(eq) at 155° C. is comprised between 24 and 70 hours and preferentially between 28 and 40 hours, the equivalent time t(eq) at 155° C. being defined by the formula:

$$t(eq) = \frac{\int \exp(-16000/T)dt}{\exp(-16000/T_{ref})}$$

where T is the instantaneous temperature in °K during annealing and $T_{ref}$ is a reference temperature selected at 155° C. (428° K), t(eq) is expressed in hours.

BRIEF DESCRIPTION OF THE DRAWINGS

FIG. 1: Relationship between Average EAC days to failure and ST TYS for the alloys of the example.

DETAILED DESCRIPTION

Unless otherwise indicated, all the indications relating to the chemical composition of the alloys are expressed as a mass percentage by weight based on the total weight of the alloy. The expression Cu*Mg means the Cu content in weight % multiplied by the Mg in weight %. Alloy designation is in accordance with the regulations of The Aluminium Association, known to those skilled in the art. The definitions of tempers are laid down in EN 515 (1993).

Unless mentioned otherwise, static mechanical characteristics, i.e., the ultimate tensile strength UTS, the tensile yield stress TYS and the elongation at fracture E, are determined by a tensile test according to standard NF EN ISO 6892-1 (2016), the location at which the pieces are taken and their direction being defined in standard EN 485 (2016).

Unless otherwise specified, the definitions of standard EN 12258 apply.

The fracture toughness $K_{1C}$ is determined according to ASTM standard E399 (2012).

EAC under conditions of high stress and humid environment was tested under a constant load on a tensile sample at mid-thickness as described in standard ASTM G47 and using a load of about 85% of ST direction TYS, under 85% relative humidity, and at a temperature of 70° C. The average days to failure was calculated from at least 3 specimens for each plate.

When used in this description the symbol * means multiply by.

The term "structural member" is a term well known in the art and refers to a component used in mechanical construction for which the static and/or dynamic mechanical characteristics are of particular importance with respect to structure performance, and for which a structure calculation is usually prescribed or undertaken. These are typically components the rupture of which may seriously endanger the safety of the mechanical construction, its users or third parties. In the case of an aircraft, structural members comprise members of the fuselage (such as fuselage skin), stringers, bulkheads, circumferential frames, wing components (such as wing skin, stringers or stiffeners, ribs, spars), empennage (such as horizontal and vertical stabilisers), floor beams, seat tracks, and doors.

The alloy of the invention has a specific composition which, in particular when combined with an appropriately designed aging treatment, makes it possible to obtain products insensitive to EAC under conditions of high stress and humid environment and having simultaneously high strength and high toughness properties.

A minimum Zn content of 6.9 and preferably 6.95 or even 7.0 or even preferably 7.05 is needed to obtain sufficient strength. However the Zn content should not exceed 7.5, preferably 7.40, more preferably 7.30 and preferentially 7.25 and even preferentially 7.20 to obtain the sought balance of properties, in particular toughness and elongation.

A minimum Mg content of 1.8 and preferably 1.85 or even 1.90 is needed to obtain sufficient strength. However the Mg content should not exceed 2.2 and preferably 2.15 or even preferably 2.10 to obtain the sought balance of properties in particular toughness and elongation.

A minimum Cu content of 1.8 and preferably 1.85 or 1.90 or even 1.95 is needed to obtain sufficient strength and to obtain sufficient EAC performance. It is generally advantageous that the Cu content is higher than 2.7*Mg−0.5*Zn and preferably higher than 2.7*Mg−0.5*Zn+0.1. However the Cu content should not exceed 2.2 and preferably 2.15, 2.13, 2.11 or even preferably 2.10 in particular to avoid quench sensitivity. In another embodiment, the Cu content is less than 2.7*Mg−0.5*Zn+0.3, preferably less than 2.7*Mg−0.5*Zn+0.25 and more preferably less than 2.7*Mg−0.5*Zn+0.2.

This embodiment is particularly advantageous in some instances for thickness of at least 90 mm.

In order to obtain products with low sensitivity to EAC under conditions of high stress and humid environment and avoid quench sensitivity, the sum Cu+Mg is carefully controlled between 3.8 and 4.2, preferably between 3.85 and 4.15.

Optionally, the Cu/Mg ratio is controlled to at least 0.85. A minimum Cu/Mg ratio of 0.90 or preferably 0.95 is advantageous. In an embodiment the maximum Cu/Mg ratio is 1.15 and preferably 1.10.

The alloys of the present invention further contains 0.04 to 0.14 wt. % zirconium, which is typically used for grain size control. The Zr content should preferably comprise at least about 0.07 wt. %, and preferentially about 0.09 wt. % in order to limit the recrystallization, but should advantageously remain below about 0.12 wt. % in order to reduce problems during casting.

Titanium, associated with either boron or carbon can usually be added up to 0.15 wt. % if desired during casting in order to limit the as-cast grain size. The present invention may typically accommodate up to about 0.06 wt. % or about 0.05 wt. % Ti. In a preferred embodiment of the invention, the Ti content is about 0.02 wt. % to about 0.06 wt. % and preferentially about 0.03 wt. % to about 0.05 wt. %.

Manganese up to 0.1 wt. % may be added but it is preferentially avoided and is generally kept below about 0.05 wt. %, preferentially below about 0.04 wt. %. and more preferentially below about 0.03 wt. %.

Vanadium up to 0.1 wt. % may be added but it is preferentially avoided and is generally kept below about 0.05 wt. %, preferentially below about 0.04 wt. %. and more preferentially below about 0.03 wt. %.

Chromium is preferentially avoided and is kept below 0.05 wt. %, preferentially below about 0.04 wt. %. and more preferentially below about 0.03 wt. %.

The present alloy can further contain other elements to a lesser extent and in some embodiments, on a less preferred basis. Iron and silicon typically affect fracture toughness properties. Iron and silicon content should generally be kept low, with a content of at most 0.15 wt. %, and preferably not exceeding about 0.13 wt. % or preferentially about 0.10 wt. % for iron and preferably not exceeding about 0.10 wt. % or preferentially about 0.08 wt. % for silicon. In one embodiment of the present invention, iron and silicon content are ≤0.07 wt. %.

Other elements are impurities which should have a maximum content of 0.05 wt. % each and ≤0.15 wt. % total, preferably a maximum content of 0.03 wt. % each and ≤0.10 wt. % total. The balance is aluminum.

A suitable process for producing rolled products according to the present invention comprises: (i) casting an ingot made in an alloy according to the invention, (ii) conducting an homogenization of the ingot preferably with at least one step at a temperature from about 460 to about 510° C. or preferentially from about 470 to about 500° C. typically for 5 to 30 hours, (iii) hot rolling of said homogenized ingot in one or more stages, with an entry temperature preferably comprised from about 380 to about 460° C. and preferentially between about 400 and about 450° C., to a rolled product with a final thickness of at least 50 mm, (iv) conducting a solution heat treatment preferably at a temperature from 460 to about 510° C. or preferentially from about 470 to about 500° C. typically for 1 to 10 hours depending on thickness, (v) conducting a quench, preferentially with room temperature water, (vi) conducting stress relieving by controlled stretching or compression with a permanent set of preferably less than 5% and preferentially from 1 to 4%, and, (vii) conducting an artificial aging treatment, with the equivalent aging time t(eq) at 155° C. comprised between 24 and 70 hours and preferentially between 28 and 40 hours, the equivalent time t(eq) at 155° C. being defined by the formula:

$$t(eq) = \frac{\int \exp(-16000/T)dt}{\exp(-16000/T_{ref})}$$

where T is the instantaneous temperature in ° K during annealing and $T_{ref}$ is a reference temperature selected at 155° C. (428° K), t(eq) is expressed in hours.

The present invention finds particular utility in thick gauges of at least 50 mm. In a preferred embodiment, a rolled product of the present invention is a plate having a thickness from 60 to 200 mm, or advantageously from 75 to 150 mm comprising an alloy according to the present invention. For plate of such gauges, the properties in the short transverse direction are of great importance as the plate is often used in machined parts that can be loaded in multiple directions, including that corresponding to the ST properties of the original plate. This is not the case for thinner plate or extrusion, for which the parts concerned are generally principally loaded in their plane, i.e. in the L or LT directions. For this reason, the ST properties are emphasized in the description below. Seeking improved properties in thick gauges faces two natural phenomena. First, as a product shape thickens, the quench rate experienced at the interior cross section of that product naturally decreases. That decrease, in turn, results in a loss of strength and fracture toughness for thicker product shapes, especially in inner regions across the thickness. Those skilled in the art refer to this phenomenon as "quench sensitivity". Second, there is also a well known, inverse relationship between strength and fracture toughness such that as component parts are designed for ever greater strength loads, their relative toughness performance decreases . . . and vice versa. For these reasons compositions used for lower thicknesses are not generally applied in thick gauges.

Aging treatment is advantageously carried out in two steps, with a first step at a temperature comprised between 110 and 130° C. for 3 to 20 hours and preferably for 5 to 12 hours and a second step at a temperature comprised between 140 and 170° C. for 5 to 90 hours and preferably between 150 and 155° C. for 20 to 50 hours.

For a given equivalent ageing time, lower second step ageing temperatures are advantageous as they enable taking the most solute out of solution. However, in order to ensure an industrially acceptable ageing time, the ageing temperature selected must not be too low. Thus a maximum temperature of 155° C. is advantageous because it enables to take the most solute out of solution while keeping an industrial aging time.

The composition range of the alloy from the invention, selected mainly for a strength versus toughness compromise provided rolled products with unexpectedly high EAC performance under conditions of high stress and humid environment.

Thus a product according to the invention has advantageously the following properties:

a) a minimum life without failure after Environmentally Assisted Cracking (EAC) under conditions of high stress, at a short transverse (ST) stress level of 85% of the product tensile yield strength in ST direction, and humid environment with 85% relative humidity at a temperature of 70° C., of at least 40 days, preferably 80 days and even more preferably 120 days, b) a conventional tensile yield strength measured in the ST direction at mid thickness of at least 467−0.27*t MPa and preferably of 477−0.27*t MPa and even more preferably of 487−0.27*t MPa (t being the thickness of the product in mm)

c) a $K_{1C}$ toughness in the S-L direction measured at mid thickness of at least 26−0.01*t MPa√m and preferably 28−0.01*t MPa√m and even more preferably 30−0.01*t MPa√m (t being the thickness of the product in mm).

Advantageously, the product of the invention also has the following properties d) a conventional tensile yield strength measured in the L direction at quarter thickness of at least 505−0.26*t MPa and preferably of 515−0.26*t MPa and even more preferably of 525−0.26*t MPa (t being the thickness of the product in mm), e) a $K_{1C}$ toughness in the L-T direction measured at quarter thickness of at least 36−0.1*t MPa√m and preferably 37−0.1*t MPa√m and even more preferably 38−0.1*t MPa√m (t being the thickness of the product in mm).

In an embodiment, where the Cu content is from 1.95 to 2.15 wt. %, the product according to the invention has advantageously the following properties:

a) a minimum life without failure after Environmentally Assisted Cracking (EAC) under conditions of high stress, at a short transverse (ST) stress level of 85% of the product tensile yield strength in ST direction, and humid environment with 85% relative humidity at a temperature of 70° C., of at least 40 days, preferably 80 days and even more preferably 120 days, b) a conventional tensile yield strength measured in the ST direction at mid thickness of at least 477−0.27*t MPa and preferably of 487−0.27*t MPa and even more preferably of 497−0.27*t MPa (t being the thickness of the product in mm)

c) a $K_{1C}$ toughness in the S-L direction measured at mid thickness of at least 28-0.01*t MPa√m and preferably 30−0.01*t MPa√m and even more preferably 32−0.01*t MPa√m (t being the thickness of the product in mm).

Advantageously, the product of the invention also has the following properties d) a conventional tensile yield strength measured in the L direction at quarter thickness of at least 515−0.26*t MPa and preferably of 525−0.26*t MPa and even more preferably of 535−0.26*t MPa (t being the thickness of the product in mm), e) a $K_{1C}$ toughness in the L-T direction measured at quarter thickness of at least 42−0.1*t MPa√m and preferably 43−0.1*t MPa√m and even more preferably 44−0.1*t MPa√m (t being the thickness of the product in mm).

As tensile yield strength and toughness are conflicting properties, preferred balance of these properties may be reached in some instances by combining the advantageous feature of one property with the more preferred feature of the other property and vice versa. Advantageously the product of the invention also has a short—transverse elongation of at least 4.7%, preferably of at least 4.9% and more preferably of at least 5.1%. Preferably the minimum life without failure after Environmentally Assisted Cracking under said conditions of high stress and humid environment is of at least 50 days, more preferably of at least 70 days and preferentially of at least 90 days at a short transverse (ST) direction.

In an embodiment the conditions of high stress comprise a short transverse (ST) stress level of 380 MPa.

Preferably, the stress corrosion cracking resistance determined by using the standard stress corrosion cracking (SCC) test, given by ASTM G47, where the specimens are tested using alternate immersion and drying cycles in neutral 3.5% NaCl solution according to ASTM G44 successfully passes the 20 days criterion for 7xxx alloys, at the applied load of 310 MPa by using stress tension specimens in "constant strain"-type fixtures according to ASTM G49.

Preferably, the products of the invention are substantially unrecrystallized, with a volume fraction of recrystallized grains lower than 35%.

Rolled products according to the present invention are advantageously used as or incorporated in structural members for the construction of aircraft.

In an advantageous embodiment, the products according to the invention are used in wing ribs, spars and frames. In embodiments of the invention, the rolled products according to the present invention are welded with other rolled products to form wing ribs, spars and frames.

These, as well as other aspects of the present invention, are explained in more detail with regard to the following illustrative and non-limiting examples.

EXAMPLE

Example 1

Four ingots were cast, one of a product according to the invention (D), and three reference examples with the following composition (Table 1):

TABLE 1

| composition (wt. %) of cast according to the invention and of reference casts. | | | | | | | |
|---|---|---|---|---|---|---|---|
| Alloy | Si | Fe | Cu | Mg | Zn | Ti | Zr |
| A | 0.020 | 0.045 | 1.69 | 1.82 | 8.42 | 0.022 | 0.10 |
| B | 0.029 | 0.059 | 1.59 | 1.87 | 6.39 | 0.021 | 0.06 |
| C | 0.046 | 0.063 | 1.70 | 1.76 | 6.45 | 0.033 | 0.11 |
| D | 0.023 | 0.046 | 1.89 | 2.14 | 7.02 | 0.037 | 0.10 |

The ingots were then scalped and homogenized at 473° C. (alloy A) or 479° C. (alloys B to D). The ingots were hot rolled to a plate of thickness of 120 mm (alloy A), 100 mm (alloy B) or 102 mm (alloys C and D). The plates were solution heat treated with a soak temperature of 473° C. (alloy A) or 479° C. (alloys B to D). The plates were quenched and stretched with a permanent elongation comprised between 2.0 and 2.5%.

The plates were submitted to a two step aging of 4 hours at 120° C. followed by between 14 and 32 hours at 155° C. for a total equivalent time at 155° C. between 17 and 35 hours.

All the samples tested were substantially unrecrystallized, with a volume fraction of recrystallized grains lower than 35%.

The samples were mechanically tested, at quarter-thickness for L and LT directions and at mid-thickness for ST direction to determine their static mechanical properties as well as their fracture toughness. Tensile yield strength, ultimate strength and elongation at fracture are provided in Table 2.

TABLE 2

| | | Static mechanical properties of the samples | | | | | | | | |
|---|---|---|---|---|---|---|---|---|---|---|
| | Total Equivalent | L Direction | | | LT Direction | | | ST Direction | | |
| Alloy | Ageing Time at 155° C. | L UTS (MPa) | L TYS (MPa) | L E % | LT UTS (MPa) | LT TYS (MPa) | LT E % | ST UTS (MPa) | ST TYS (MPa) | ST E % |
| A | 17.0 | | | | | | | 556 | 500 | 4.2 |
|   | 22.0 | | | | | | | 540 | 479 | 4.8 |
|   | 26.5 | | | | | | | 529 | 467 | 4.8 |
| B | 17.0 | | | | | | | 513 | 456 | 5.4 |
|   | 22.0 | | | | | | | 508 | 452 | 5.1 |
|   | 26.5 | | | | | | | 503 | 446 | 5.9 |
| C | 17.0 | 509 | 481 | 13.5 | 530 | 485 | 11.3 | 504 | 446 | 5.2 |
|   | 22.0 | 498 | 464 | 15.2 | 517 | 466 | 11.8 | 494 | 433 | 6.1 |
|   | 26.5 | 491 | 454 | 14.5 | 510 | 456 | 13.2 | 489 | 425 | 6.7 |
|   | 34.5 | 482 | 436 | 14.9 | 494 | 434 | 12.4 | 476 | 408 | 7.6 |
| D | 17.0 | 567 | 532 | 8.8 | 575 | 519 | 7.6 | 551 | 487 | 3.7 |
|   | 22.0 | 559 | 517 | 9.3 | 565 | 505 | 9.2 | 542 | 472 | 4.9 |
|   | 26.5 | 551 | 508 | 10.5 | 559 | 498 | 8.5 | 537 | 468 | 4.9 |
|   | 34.5 | 542 | 492 | 10.8 | 548 | 482 | 9.1 | 525 | 454 | 5.5 |

The sample according to the invention exhibits similar strength compared to comparative examples A and B and higher strength compared to reference example C.

Results of the fracture toughness testing are provided in Table 3. The test samples for $K_{IC}$ measurement were all CT40. They were taken at t/4 for L-T and T-L, and t/2 for S-L.

TABLE 3

Fracture toughness properties of the samples

| Alloy | Total Equivalent Ageing Time at 155° C. | $K_{IC}$ L-T (MPa * m$^{1/2}$) | $K_{IC}$ T-L (MPa * m$^{1/2}$) | $K_{IC}$ S-L (MPa * m$^{1/2}$) |
|---|---|---|---|---|
| A | 17.0 | | | |
|   | 22.0 | | | |
|   | 26.5 | | | |
| B | 17.0 | | | |
|   | 22.0 | | | |
|   | 26.5 | | | |
| C | 17.0 | 36.6 | 30.6 | 35.4 |
|   | 22.0 | 38.4 | 32.0 | 30.9 |
|   | 26.5 | 39.9 | 32.3 | 36.6 |
|   | 34.5 | 43.1 | 34.1 | 37.4 |
| D | 17.0 | 24.7 | 23.3 | 25.4 |
|   | 22.0 | 25.5 | 24.0 | 26.2 |
|   | 26.5 | 27.5 | 24.3 | 27.2 |
|   | 34.5 | 29.4 | 26.2 | 31.4 |

EAC under conditions of high stress and humid environment was measured with ST direction tensile specimens which are described in ASTM G47. Testing stress and environment were different from ASTM G47 and used a load of about 85% of ST direction TYS at t/2, under 85% relative humidity, and at a temperature of 70° C. The average days to failure was calculated from 3 specimens for each plate.

The results are provided in Table 4

TABLE 4

Results of EAC under conditions of high stress and humid environment

| Alloy and Temper | Total Equivalent Ageing Time at 155° C. | ST TYS t/2 (MPa) | EAC Stress | Test Method | Average Days to Failure |
|---|---|---|---|---|---|
| A | 17 | 500 | 425 | Constant Load | 7 |
|   | 22 | 479 | 407 | Constant Load | 28 |
|   | 26.5 | 467 | 397 | Constant Load | 40 |
| B | 17 | 456 | 388 | Constant Load | 28 |
|   | 22 | 452 | 384 | Constant Load | 18 |
|   | 26.5 | 446 | 379 | Constant Load | 40 |
| C | 17 | 446 | 412 | Constant Load | 17 |
|   | 22 | 433 | 396 | Constant Load | 29 |
|   | 26.5 | 425 | 387 | Constant Load | 35 |
|   | 34.5 | 408 | 368 | Constant Load | 97 |
| D | 17 | 487 | 414 | Constant Load | 86 |
|   | 22 | 472 | 401 | Constant Load | 75 |
|   | 26.5 | 468 | 397 | Constant Load | 141 |
|   | 34.5 | 454 | 385 | Constant Load | 202 |

The resistance to EAC under conditions of high stress and humid environment of alloy D (inventive) plate in the short transverse direction was surprisingly high with an improvement of at least about 120 days compared to the reference examples for essentially the same TYS value. The inventive alloy D exhibited outstanding EAC performance under conditions of high stress and humid environment compared to known prior art. It was particularly impressive and unexpected that a plate according to the present invention exhibited a higher level of EAC resistance simultaneously with a comparable tensile strength and fracture toughness compared to prior art samples.

The Stress Corrosion Cracking resistance was determined by using the standard stress corrosion cracking (SCC) test, given by ASTM G47, where the specimens are tested using alternate immersion and drying cycles in neutral 3.5% NaCl solution according to ASTM G44. The product of the invention aged with a total equivalent ageing time of 30 hours at 155° C. successfully passed the 20 days criterion for 7xxx alloys, at the applied load of 310 MPa by using stress tension specimens in "constant strain"-type fixtures according to ASTM G49.

Example 2

Three ingots were cast, according to the invention with the following composition (Table 5):

TABLE 5

| | composition (wt. %) | | | | | | |
|---|---|---|---|---|---|---|---|
| Alloy | Si | Fe | Cu | Mg | Zn | Ti | Zr |
| E | 0.034 | 0.071 | 2.09 | 2.05 | 7.19 | 0.032 | 0.10 |
| F | 0.029 | 0.062 | 2.13 | 2.02 | 7.12 | 0.032 | 0.10 |
| G | 0.027 | 0.055 | 2.11 | 2.01 | 7.14 | 0.033 | 0.10 |

The ingots were then scalped and homogenized at 479° C. The ingots were hot rolled to a plate of thickness of 76 mm and 152 mm (alloy E), 102 mm and 200 mm (alloy F) or 127 mm (alloy G). The plates were solution heat treated with a soak temperature of 479° C. The plates were quenched and stretched with a permanent elongation comprised between 2.0 and 2.5%.

The plates were submitted to a two step aging of 4 hours at 120° C. followed by between 14 and 32 hours at 155° C. for a total equivalent time at 155° C. between 22 and 35 hours.

All the samples tested were substantially unrecrystallized, with a volume fraction of recrystallized grains lower than 35%.

The samples were mechanically tested, at quarter-thickness for L and LT directions and at mid-thickness for ST direction to determine their static mechanical properties as well as their fracture toughness. Tensile yield strength, ultimate strength and elongation at fracture are provided in Table 6.

TABLE 6

Static mechanical properties of the samples

| Alloy | Thickness (mm) | Total Equivalent Ageing Time at 155° C. | L Direction | | | LT Direction | | | ST Direction | | |
|---|---|---|---|---|---|---|---|---|---|---|---|
| | | | L UTS (MPa) | L TYS (MPa) | L E % | LT UTS (MPa) | LT TYS (MPa) | LT E % | ST UTS (MPa) | ST TYS (MPa) | ST E % |
| E | 76 | 22 | 554 | 518 | 12.0 | 566 | 515 | 9.5 | 553 | 486 | 6.5 |
| | | 26.5 | 553 | 517 | 11.4 | 567 | 516 | 9.5 | 551 | 484 | 6.3 |
| | | 30.5 | 553 | 518 | 11.8 | 566 | 517 | 9.0 | 552 | 484 | 6.4 |
| | | 34.5 | 553 | 519 | 12.2 | 567 | 517 | 9.9 | 552 | 483 | 6.4 |
| F | 102 | 22 | 551 | 516 | 9.7 | 561 | 507 | 8.2 | 547 | 478 | 5.8 |
| | | 26.5 | 551 | 515 | 10.1 | 561 | 507 | 8.5 | 546 | 478 | 5.6 |
| | | 30.5 | 551 | 515 | 10.1 | 561 | 507 | 8.4 | 547 | 478 | 5.6 |
| | | 34.5 | 552 | 514 | 10.8 | 559 | 506 | 8.5 | 546 | 479 | 5.0 |
| G | 127 | 22 | 547 | 505 | 9.6 | 557 | 496 | 8.1 | 535 | 465 | 5.3 |
| | | 26.5 | 545 | 503 | 9.4 | 557 | 496 | 7.7 | 537 | 465 | 5.7 |
| | | 30.5 | 547 | 505 | 9.1 | 557 | 497 | 7.9 | 524 | 466 | 2.5 |
| | | 34.5 | 546 | 505 | 9.3 | 558 | 497 | 8.0 | 533 | 461 | 5.5 |
| E | 152 | 22 | 536 | 498 | 9.2 | 544 | 484 | 6.4 | 525 | 457 | 4.3 |
| | | 26.5 | 537 | 499 | 10.0 | 543 | 481 | 6.7 | 523 | 461 | 4.0 |
| | | 30.5 | 537 | 498 | 9.4 | 543 | 482 | 6.4 | 523 | 457 | 4.8 |
| | | 34.5 | 536 | 499 | 9.6 | 543 | 481 | 6.3 | 522 | 458 | 3.5 |
| F | 200 | 22 | 530 | 488 | 7.5 | 538 | 471 | 5.4 | 500 | 446 | 2.0 |
| | | 26.5 | 531 | 487 | 8.2 | 536 | 469 | 4.8 | 498 | 445 | 1.9 |
| | | 30.5 | 531 | 488 | 8.2 | 537 | 469 | 5.4 | 498 | 446 | 1.9 |
| | | 34.5 | 530 | 487 | 7.6 | 537 | 469 | 5.2 | 505 | 445 | 2.7 |

Results of the fracture toughness testing are provided in Table 7. The test samples for $K_{IC}$ measurement were CT40 for all thicknesses except for 76 mm where it was CT30. They were taken at t/4 for L-T and T-L, and t/2 for S-L.

TABLE 7

Fracture toughness properties of the samples

| Alloy | Thickness (mm) | Total Equivalent Ageing Time at 155° C. | $K_{IC}$ L-T (MPa * m^½) | $K_{IC}$ T-L (MPa * m^½) | $K_{IC}$ S-L (MPa * m^½) |
|---|---|---|---|---|---|
| E | 76 | 22 | 33.0 | 28.0 | 29.5 |
| | | 26.5 | 33.4 | 28.1 | 29.8 |
| | | 30.5 | 35.6 | 30.0 | 31.2 |
| | | 34.5 | 37.0 | 30.3 | 32.0 |
| F | 102 | 22 | 30.5 | 26.2 | 26.9 |
| | | 26.5 | 31.0 | 26.7 | 27.9 |
| | | 30.5 | 34.3 | 28.6 | 29.1 |
| | | 34.5 | 34.5 | 29.7 | 31.2 |
| G | 127 | 22 | 27.1 | 23.8 | 28.2 |
| | | 26.5 | 28.7 | 24.6 | 26.2 |
| | | 30.5 | 29.9 | 25.1 | 29.8 |
| | | 34.5 | 33.0 | 27.6 | 30.1 |
| E | 152 | 22 | 28.7 | 23.5 | 24.4 |
| | | 26.5 | 27.8 | 24.3 | 25.1 |
| | | 30.5 | 30.0 | 24.9 | 26.5 |
| | | 34.5 | 31.7 | 25.8 | 27.8 |
| F | 200 | 22 | 28.7 | 21.5 | 22.7 |
| | | 26.5 | 29.2 | 22.4 | 24.3 |
| | | 30.5 | 30.3 | 23.9 | 24.7 |
| | | 34.5 | 30.2 | 24.3 | 26.6 |

In the embodiment illustrated by these examples, the strength is increased for a comparable toughness compared to alloy D of example 1.

All documents referred to herein are specifically incorporated herein by reference in their entireties.

As used herein and in the following claims, articles such as "the", "a" and "an" can connote the singular or plural.

In the present description and in the following claims, to the extent a numerical value is enumerated, such value is intended to refer to the exact value and values close to that value that would amount to an insubstantial change from the listed value.

The invention claimed is:

1. A process for manufacture of a rolled aluminum-based alloy product comprising:
   a) casting an ingot comprising (in weight %)
   Zn 6.9-7.5
   Mg 1.85-2.2
   Cu 1.95-2.15, wherein the sum Cu+Mg is between 3.8 and 4.2
   Zr 0.04-0.14
   Mn 0-0.1
   Ti 0-0.15
   V 0-0.1
   Fe ≤0.15
   Si ≤0.15
   impurities ≤0.05 each and ≤0.15 wt. % total, balance aluminum;
   b) homogenizing the ingot;
   c) hot rolling said homogenized ingot to a rolled product with a final thickness of from 75 mm to 150 mm;
   d) solution heat treating and quenching the product;
   e) stretching the product;
   f) artificial aging with the equivalent aging time t(eq) at 155° C. is comprised between 30.5 and 34.5 hours, equivalent time t(eq) at 155° C. being defined by the formula:

$$t(eq) = \frac{\int \exp(-16000/T)dt}{\exp(-16000/T_{ref})}$$

where T is the instantaneous temperature in K during annealing and $T_{ref}$ is a reference temperature selected at 155° C. (428 K), t(eq) is expressed in hours,
wherein the rolled aluminum-based alloy product has the following properties:
   a) a minimum life without failure after Environmentally Assisted Cracking under conditions of high stress, at a short transverse stress level of 85% of a tensile yield strength of the product in an ST direction, and humid environment with 85% relative humidity at a temperature of 70° C., of at least 80 days,
   b) a tensile yield strength measured in the ST direction at a mid-thickness of at least 477-0.27*tMPa, t being the thickness of the product in mm,
   c) a $K_{1C}$ toughness in an S-L direction measured at a mid-thickness of at least 30-0.01*tMPa√m, t being the thickness of the product in mm,
and wherein
   d) a tensile yield strength measured in an L direction at a quarter thickness of at least 515-0.26*tMPa(t being the thickness of the product in mm),
   e) a $K_{1C}$ toughness in an L-T direction measured at a quarter thickness of at least 42-0.1*tMPa√m(t being the thickness of the product in mm).

2. The process according to claim 1, wherein Cu content is in a range from 1.95 to 2.10 wt. %.

3. The process according to claim 1, wherein Mg content is in a range from 1.90 to 2.10 wt. %.

4. The process according to claim 1, wherein Zn content is in a range from 7.0 to 7.20 wt. %.

5. The process according to claim 1, wherein Cu>2.7*Mg-0.5*Zn.

6. The process according to claim 1 wherein Cu<2.7*Mg-0.5*Zn+0.3.

7. The process according to claim 1 wherein the Cu content is from 1.95 to 2.10 wt. % and wherein the rolled aluminum-based alloy product has the following properties:
   a) a minimum life without failure after Environmentally Assisted Cracking under conditions of high stress, at a short transverse stress level of 85% of a tensile yield strength of the product in an ST direction, and humid environment with 85% relative humidity at a temperature of 70° C., of at least 80 days,
   b) a tensile yield strength measured in an ST direction at a mid-thickness of at least 487-0.27*tMPa, t being the thickness of the product in mm,
   c) a $K_{1C}$ toughness in an S-L direction measured at a mid-thickness of at least 30-0.01*tMPa√m, t being the thickness of the product in mm.

8. The process according to claim 1, wherein Zn content is in a range from 6.9 to 7.3 wt. %.

9. The process according to claim 1, wherein the rolled aluminum-based alloy product has the following properties:
   a) a minimum life without failure after Environmentally Assisted Cracking under conditions of high stress, at a short transverse stress level of 85% of a tensile yield strength of the product in an ST direction, and humid environment with 85% relative humidity at a temperature of 70° C., of at least 120 days,
   b) a tensile yield strength measured in an ST direction at a mid-thickness of at least 487-0.27*tMPa, t being the thickness of the product in mm,
   c) a $K_{1C}$ toughness in an S-L direction measured at a mid-thickness of at least 30-0.01*tMPa√m, t being the thickness of the product in mm,
   d) a tensile yield strength measured in an L direction at a quarter thickness of at least 525-0.26*tMPa, t being the thickness of the product in mm,
   e) a $K_{1C}$ toughness in an L-T direction measured at a quarter thickness of at least 42-0.1*tMPa√m, t being the thickness of the product in mm.

10. The process according to claim 1 wherein the Cu content is from 1.95 to 2.10 wt. % and wherein the rolled aluminum-based alloy product has the following properties:
   a) a minimum life without failure after Environmentally Assisted Cracking under conditions of high stress, at a short transverse stress level of 85% of a tensile yield strength of the product in an ST direction, and humid environment with 85% relative humidity at a temperature of 70° C., of at least 120 days,
   b) a tensile yield strength measured in an ST direction at a mid-thickness of at least 497-0.27*tMPa, t being the thickness of the product in mm,
   c) a $K_{1C}$ toughness in an S-L direction measured at a mid-thickness of at least 32-0.01*tMPa√m, t being the thickness of the product in mm, d) a tensile yield strength measured in an L direction at a quarter thickness of at least 535-0.26*tMPa(t being the thickness of the product in mm),
e) a $K_{1C}$ toughness in an L-T direction measured at a quarter thickness of at least 44-0.1*tMPa√m(t being the thickness of the product in mm).

11. The process according to claim 1, wherein the ingot consists essentially of, in weight %:
Zn 6.9-7.5
Mg 1.85-2.2
Cu 1.95-2.15, wherein the sum Cu+Mg is between 3.8 and 4.2
Zr 0.04-0.14
Mn 0-0.1
Ti 0-0.15
V 0-0.1
Fe ≤0.15
Si ≤0.15
impurities ≤0.05 each and ≤0.15 wt. % total, balance aluminum.

12. The process according to claim 1, wherein the ingot consists of, in weight %:
Zn 6.9-7.5
Mg 1.85-2.2
Cu 1.95-2.15, wherein the sum Cu+Mg is between 3.8 and 4.2
Zr 0.04-0.14
Mn 0-0.1
Ti 0-0.15
V 0-0.1
Fe ≤0.15
Si ≤0.15
impurities ≤0.05 each and ≤0.15 wt. % total, balance aluminum.

* * * * *